US012675095B2

(12) United States Patent
Ratliff

(10) Patent No.: US 12,675,095 B2
(45) Date of Patent: Jul. 7, 2026

(54) DECIDER NETWORKS FOR REACTIVE DECISION-MAKING FOR ROBOTIC SYSTEMS AND APPLICATIONS

(71) Applicant: NVIDIA Corporation, Santa Clara, CA (US)

(72) Inventor: Nathan Donald Ratliff, Seattle, WA (US)

(73) Assignee: NVIDIA Corporation, Santa Clara, CA (US)

( * ) Notice: Subject to any disclaimer, the term of this patent is extended or adjusted under 35 U.S.C. 154(b) by 240 days.

(21) Appl. No.: 18/321,827

(22) Filed: May 23, 2023

(65) Prior Publication Data

US 2024/0319713 A1      Sep. 26, 2024

Related U.S. Application Data

(60) Provisional application No. 63/491,207, filed on Mar. 20, 2023.

(51) Int. Cl.
*G05B 19/4155*        (2006.01)
*B25J 9/16*            (2006.01)
(52) U.S. Cl.
CPC ........ *G05B 19/4155* (2013.01); *B25J 9/1664* (2013.01); *G05B 2219/50391* (2013.01)
(58) Field of Classification Search
CPC ...... G05B 19/4155; G05B 2219/50391; G05B 2219/34416; G05B 2219/37544; G05B 2219/40394; G05B 2219/40427; G05B 19/045; G05B 2219/13009; G05B 2219/23287; B25J 9/1664; B25J 9/1661; B25J 9/1602; B25J 9/1628; B25J 9/163; B25J 9/1656; B25J 9/1666; B25J 9/1679; B60W 60/001

See application file for complete search history.

(56) References Cited

U.S. PATENT DOCUMENTS

| | | | | |
|---|---|---|---|---|
| 11,025,702 | B2 * | 6/2021 | Levy-Abegnoli ....... | H04L 43/20 |
| 2019/0228495 | A1 | 7/2019 | Tremblay et al. | |
| 2020/0061811 | A1 | 2/2020 | Iqbal et al. | |
| 2021/0060771 | A1 * | 3/2021 | Gaydarov .............. | B25J 9/1674 |
| 2021/0146531 | A1 | 5/2021 | Tremblay et al. | |
| 2021/0272304 | A1 | 9/2021 | Yang et al. | |
| 2022/0244708 | A1 * | 8/2022 | Gemignani ............... | G06F 8/34 |
| 2022/0274255 | A1 * | 9/2022 | Okawa .................. | B25J 9/1697 |
| 2022/0347846 | A1 * | 11/2022 | Gaschler ............... | B25J 9/1694 |
| 2022/0371184 | A1 | 11/2022 | Ratliff et al. | |
| 2023/0162539 | A1 * | 5/2023 | Li ........................... | G06N 7/01 |
| | | | | 701/23 |

(Continued)

*Primary Examiner* — Esvinder Singh
(74) *Attorney, Agent, or Firm* — Foley & Lardner LLP

(57)        ABSTRACT

In various examples, systems and methods are disclosed relating to decider networks for reactive decision-making, including for control of robotic systems. The decider networks can allow robotic systems to operate more collaboratively, such as by allowing the robotic systems to more frequently process and react to dynamic states of the environment and objects in the environment, such as to change decisions and/or paths of decision execution responsive to dynamic changes in logical states. The decider network can include a plurality of nodes having functions to process the logical states in sequence to determine actions for the robotic systems to perform.

20 Claims, 6 Drawing Sheets

(56) References Cited

U.S. PATENT DOCUMENTS

| | | | |
|---|---|---|---|
| 2023/0330764 A1* | 10/2023 | Ott | B23K 9/12 |
| 2024/0123621 A1* | 4/2024 | Fujii | B25J 9/1664 |
| 2024/0174256 A1* | 5/2024 | Narayanan | B60W 60/001 |

* cited by examiner

300

IDENTIFY STATE OF ENVIRONMENT
B302

DETERMINE ACTION FOR ROBOT TO PERFORM BASED ON
PROCESSING STATE USING NETWORK OF NODES
B304

CONTROL OPERATION OF ROBOT ACCORDING TO ACTION
B306

400

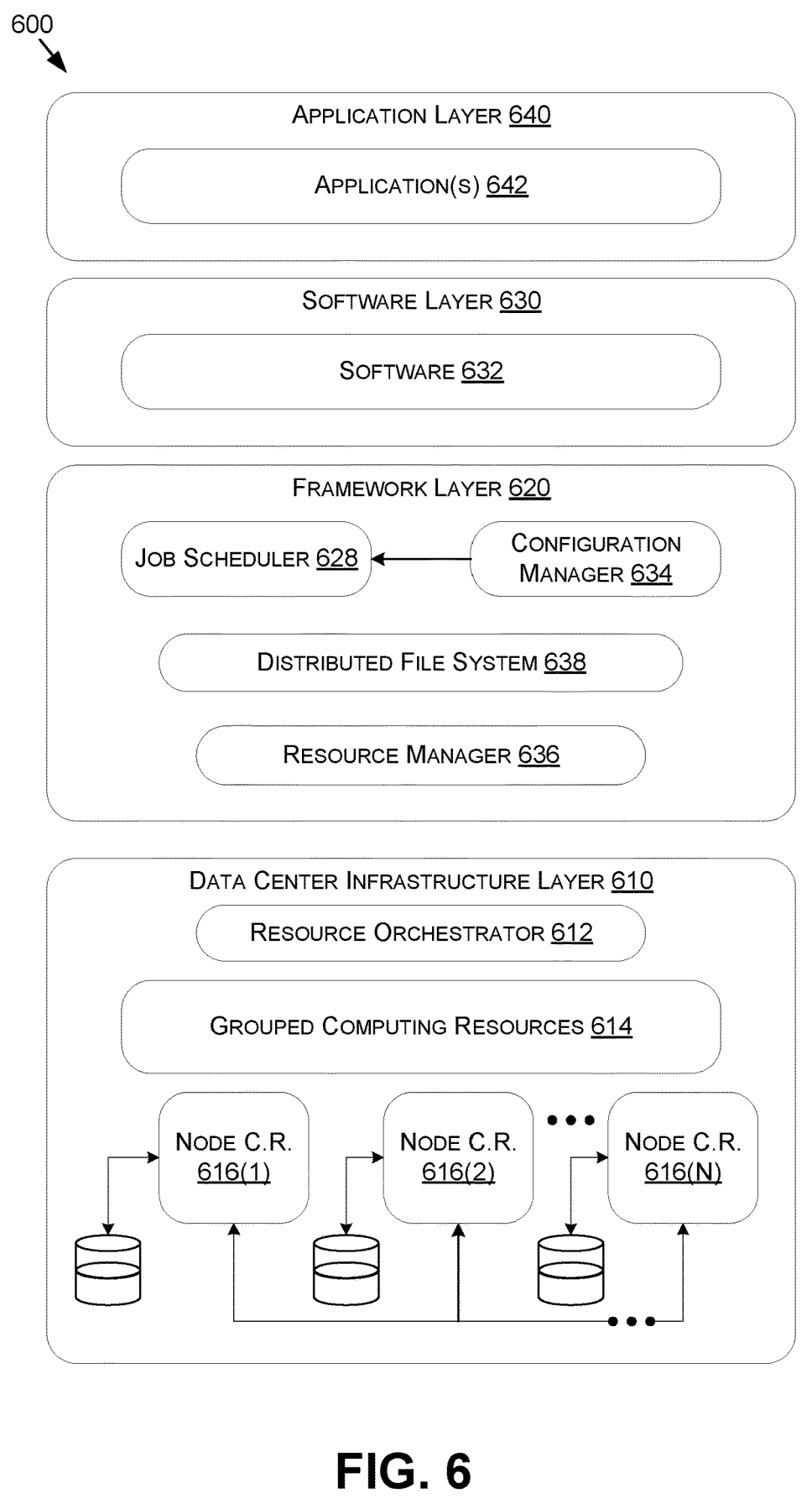

600

APPLICATION LAYER 640

APPLICATION(S) 642

SOFTWARE LAYER 630

SOFTWARE 632

FRAMEWORK LAYER 620

JOB SCHEDULER 628 ← CONFIGURATION MANAGER 634

DISTRIBUTED FILE SYSTEM 638

RESOURCE MANAGER 636

DATA CENTER INFRASTRUCTURE LAYER 610

RESOURCE ORCHESTRATOR 612

GROUPED COMPUTING RESOURCES 614

NODE C.R. 616(1)     NODE C.R. 616(2)     • • •     NODE C.R. 616(N)

FIG. 6

DECIDER NETWORKS FOR REACTIVE DECISION-MAKING FOR ROBOTIC SYSTEMS AND APPLICATIONS

CROSS-REFERENCE TO RELATED APPLICATIONS

The present application claims the benefit of and priority to U.S. Provisional Application No. 63/491,207, filed Mar. 20, 2023, the disclosure of which is incorporated herein by reference in its entirety.

BACKGROUND

Robotic systems, such as industrial robots, can by operated using various control schemes or algorithms. The robotic systems can perform operations such as manipulating subjects. For example, the robotic systems can receive sensor data regarding an environment, and determine an action to take according to the sensor data. However, processes for using the sensor data may not be able to allow the robot to react to changes in the environment, or may require highly complex control algorithms and/or exception-based approaches to account for changes in the environment.

SUMMARY

Embodiments of the present disclosure relate to systems and methods for decider networks for reactive decision-making for robotic systems and applications. In contrast to conventional systems, such as those described above, systems and methods in accordance with the present disclosure can use the decider networks to prioritize evaluating states of the environment in order to more effectively react to changes in state.

At least one aspect relates to a processor. The processor can include one or more circuits to identify one or more states of an environment. The one or more circuits can determine, using a network of nodes and based at least on the one or more states, at least one action for a robot to perform. The one or more circuits can control operation of the robot according to the at least one action.

In some implementations, the network of nodes may be arranged in a structure according to an acyclic graph having a root node and a plurality of leaf nodes. The one or more circuits can determine, using the root node and the at least one state, a path of the network from the root node to a selected leaf node of the plurality of leaf nodes. The one or more circuits can determine the at least one action using the selected leaf node. The one or more circuits can configure a data structure representing the network of nodes, in a memory device of the one or more circuits, according to input received via a user interface. In some implementations, the root node can be assigned a first function of the one or more functions. The plurality of leaf nodes can each be assigned a respective second function of the one or more functions. Each function can be configured to determine an output responsive to evaluating a respective condition according to at least one of (i) the at least one state of the environment or (ii) the one or more robot states of the robot The first function can indicate a path through the network of nodes to a selected leaf node of the plurality of nodes. The second function can indicate a selection of the at least one action from the one or more actions.

In some implementations, the one or more circuits can, for each respective cycle of a plurality of cycles, determine at least one state for the respective cycle. The one or more circuits can determine the at least one action according to the at least one state for the respective cycle.

In some implementations, the one or more circuits can select, based at least on a first function of a first node of the network and the at least one state, one of a second node of the network or a third node of the network. The one or more circuits can determine the at least one action using the selected one of the second node or third node.

In some implementations, the one or more circuits can identify in a first cycle, based at least on a first function of a root node of the network, and responsive to the at least one state having a first value, a second node of the network, and determine the at least one action according to a second function of the second node. In some implementations, the one or more processors can identify in a second cycle, based at least on the first function of the root node, and responsive to the at least one state having a second value different from the first value, a third node of the network, and can determine the at least one action according to a third function of the third node.

In some implementations, the environment includes at least one of a real-world environment or a simulated environment. In some implementations, the robot includes at least one of a robotic arm, an end effector, a vehicle controller, a collaborative robot, or a controller of a simulation agent. In some implementations, the at least one state includes a state of an object remote from the robot.

In some implementations, the one or more circuits can determine, according to the at least one action and a policy associated with the at least one action, a plurality of operations for the robot to perform. In some implementations, the one or more circuits can maintain a record of a first path through the network of nodes, in a first cycle of processing the at least one state to determine the at least one action, from a root node to a leaf node. The one or more circuits can determine, in a second cycle of processing the at least one state, a branch from the first path to a second path. The one or more circuits can perform an exit operation on each node of the network of nodes from the leaf node to a node associated with the branch. In some implementations, the one or more circuits can, for each respective cycle of a plurality of sequential cycles of processing the at least one state using the network of nodes, re-evaluate the at least one state prior to determining the at least one action for the respective cycle.

At least one aspect relates to a system. The system can include one or more processors to identify at least one state of an environment. The one or more processors can determine, using a network of nodes and based at least on the at least one state, at least one action for a robot to perform. The one or more processors can control operation of the robot according to the at least one action.

In some implementations, the network of nodes may be arranged in a structure according to an acyclic graph having a root node and a plurality of leaf nodes. The one or more processors can determine, using the root node and the at least one state, a path of the network from the root node to a selected leaf node of the plurality of leaf nodes. The one or more processors can determine the at least one action using the selected leaf node. The one or more processors can configure a data structure representing the network of nodes, in a memory device of the one or more processors, according to input received via a user interface. In some implementations, the root node can be assigned a first function of the one or more functions. The plurality of leaf nodes can each be assigned a respective second function of the one or more functions. Each function can be configured to determine an output responsive to evaluating a respective condition according to at least one of (i) the at least one state of the environment or (ii) the one or more robot states of the robot The first function can indicate a path through the network of nodes to a selected leaf node of the plurality of nodes. The second function can indicate a selection of the at least one action from the one or more actions.

In some implementations, the one or more processors can, for each respective cycle of a plurality of cycles, determine at least one state for the respective cycle. The one or more processors can determine the at least one action according to the at least one state for the respective cycle.

In some implementations, the one or more processors can select, based at least on a first function of a first node of the network and the at least one state, one of a second node of the network or a third node of the network. The one or more processors can determine the at least one action using the selected one of the second node or third node.

In some implementations, the one or more processors can identify in a first cycle, based at least on a first function of a root node of the network, and responsive to the at least one state having a first value, a second node of the network, and determine the at least one action according to a second function of the second node. In some implementations, the one or more processors can identify in a second cycle, based at least on the first function of the root node, and responsive to the at least one state having a second value different from the first value, a third node of the network, and can determine the at least one action according to a third function of the third node.

In some implementations, the environment includes at least one of a real-world environment or a simulated environment. In some implementations, the robot includes at least one of a robotic arm, an end effector, a vehicle controller, a collaborative robot, or a controller of a simulation agent. In some implementations, the at least one state includes a state of an object remote from the robot.

In some implementations, the one or more processors can determine, according to the at least one action and a policy associated with the at least one action, a plurality of operations for the robot to perform. In some implementations, the one or more processors can maintain a record of a first path through the network of nodes, in a first cycle of processing the at least one state to determine the at least one action, from a root node to a leaf node. The one or more processors can determine, in a second cycle of processing the at least one state, a branch from the first path to a second path. The one or more processors can perform an exit operation on each node of the network of nodes from the leaf node to a node associated with the branch. In some implementations, the one or more processors can, for each respective cycle of a plurality of sequential cycles of processing the at least one state using the network of nodes, re-evaluate the at least one state prior to determining the at least one action for the respective cycle.

At least one aspect relates to a method. The method can include identifying, using one or more processors, at least one state of an environment. The method can include determining, using the one or more processors and a network of nodes, and based at least on the at least one state, at least one action for a robot to perform. The method can include controlling operation of the robot, using the one or more processors, according to the at least one action.

In some implementations, the network of nodes may be arranged in a structure according to an acyclic graph having a root node and a plurality of leaf nodes. The method can include determining, using the root node and the at least one state, a path of the network from the root node to a selected leaf node of the plurality of leaf nodes. The method can include determining the at least one action using the selected leaf node. The method can include configuring a data structure representing the network of nodes, in a memory device of the one or more processors, according to input received via a user interface. In some implementations, the root node can be assigned a first function of the one or more functions. The plurality of leaf nodes can each be assigned a respective second function of the one or more functions. Each function can be configured to determine an output responsive to evaluating a respective condition according to at least one of (i) the at least one state of the environment or (ii) the one or more robot states of the robot The first function can indicate a path through the network of nodes to a selected leaf node of the plurality of nodes. The second function can indicate a selection of the at least one action from the one or more actions.

In some implementations, the method can include, for each respective cycle of a plurality of cycles, determining at least one state for the respective cycle. The method can include determining the at least one action according to the at least one state for the respective cycle.

In some implementations, the method can include selecting, based at least on a first function of a first node of the network and the at least one state, one of a second node of the network or a third node of the network. The method can include determining the at least one action using the selected one of the second node or third node.

In some implementations, method can include identifying in a first cycle, based at least on a first function of a root node of the network, and responsive to the at least one state having a first value, a second node of the network, and can include determining the at least one action according to a second function of the second node. In some implementations, the method can include identifying in a second cycle, based at least on the first function of the root node, and responsive to the at least one state having a second value different from the first value, a third node of the network, and can include determining the at least one action according to a third function of the third node.

In some implementations, the environment includes at least one of a real-world environment or a simulated environment. In some implementations, the robot includes at least one of a robotic arm, an end effector, a vehicle controller, a collaborative robot, or a controller of a simulation agent. In some implementations, the at least one state includes a state of an object remote from the robot.

In some implementations, the method can include determining, according to the at least one action and a policy associated with the at least one action, a plurality of operations for the robot to perform. In some implementations, the method can include maintaining a record of a first path through the network of nodes, in a first cycle of processing the at least one state to determine the at least one action, from a root node to a leaf node. The method can include determining, in a second cycle of processing the at least one state, a branch from the first path to a second path. The method can include performing an exit operation on each node of the network of nodes from the leaf node to a node associated with the branch. In some implementations, the method can include, for each respective cycle of a plurality of sequential cycles of processing the at least one state using the network of nodes, re-evaluating the at least one state prior to determining the at least one action for the respective cycle.

The processors, systems, and/or methods described herein can be implemented by, or included in at least one of a system implemented using a robot; a system associated with an autonomous or semi-autonomous machine (e.g., an in-vehicle infotainment system); a system for performing simulation operations; a system for performing digital twin operations; a system for performing light transport simula-tion; a system for performing collaborative content creation for 3D assets; a system for performing deep learning opera-tions; a system implemented using an edge device; a system for generating or presenting virtual reality (VR) content, augmented reality (AR) content, and/or mixed reality (MR) content; a system for performing conversational AI opera-tions; a system for generating synthetic data; a system for performing generative AI operations; a system at least partially implemented or developed using a collaborative content creation platform; a system incorporating one or more virtual machines (VMs); a system implemented at least partially in a data center; or a system implemented at least partially using cloud computing resources.

BRIEF DESCRIPTION OF THE DRAWINGS

The present systems and methods for decider networks for reactive decision-making are described in detail below with reference to the attached drawing figures, wherein:

FIG. 6 is a block diagram of an example data center suitable for use in implementing some embodiments of the present disclosure.

DETAILED DESCRIPTION

Figure 1:
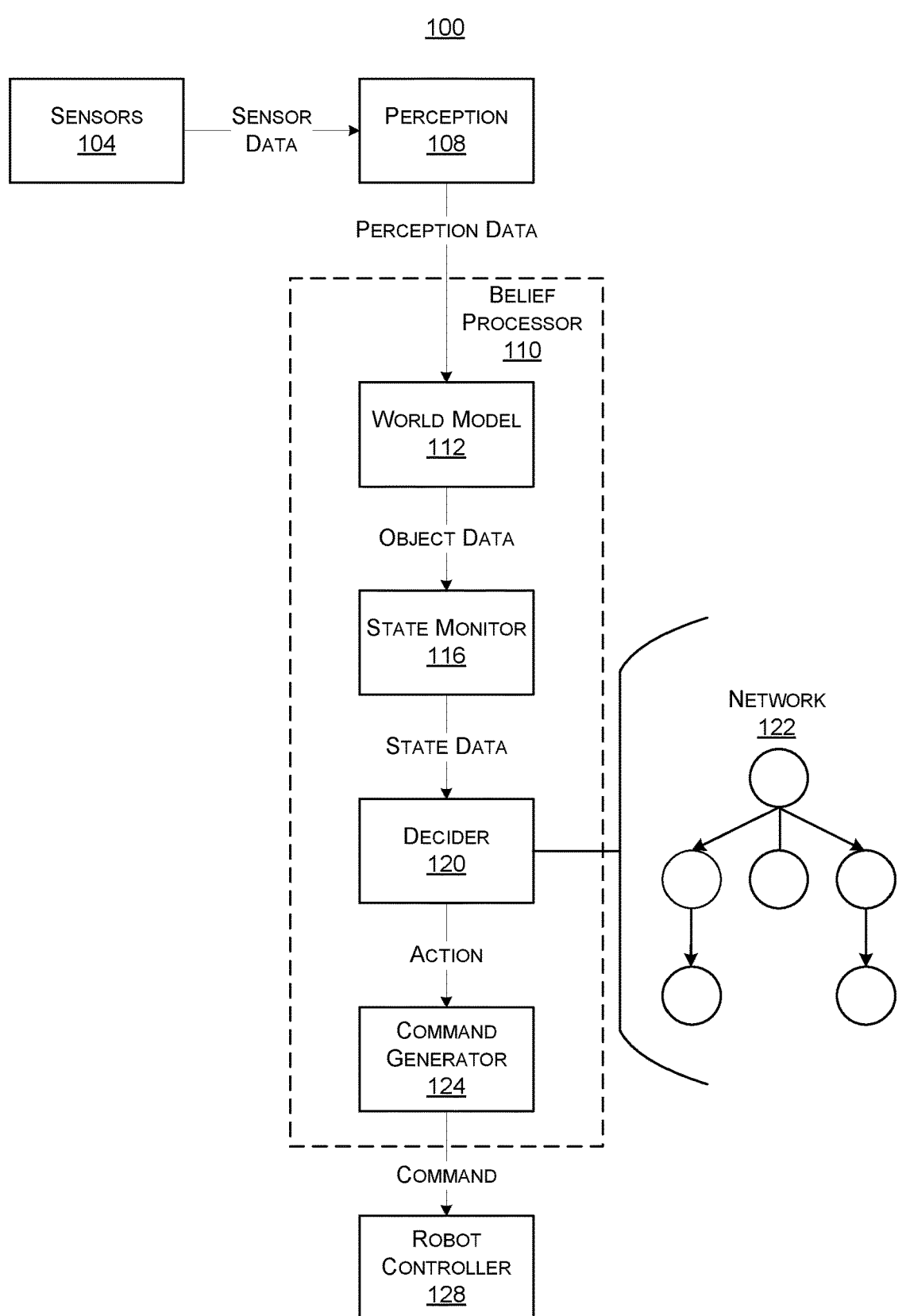
FIG. 1 is a block diagram of an example system for decider networks for reactive decision-making, in accor-dance with some embodiments of the present disclosure.

Systems and methods are disclosed related to systems and methods for decider networks for reactive decision making, such as for automated decision making by robotic systems. The robotic systems can include, for example and without limitation, industrial robots (e.g., robots operating in envi-ronments with at least some barriers relative to locations of people or various objects), collaborative robots (e.g., robots that may be operated in environments that do not have such barriers), autonomous robots, robotic arms and/or end effec-tors, surgical robots, and autonomous vehicles. In various such implementations, robotic systems may be expected to be capable of reacting to (e.g., modifying behavior responsive to) changes in the environment and states of objects or other entities in or associated with the environment. For example, some systems may use tools such as state machines or behavior trees to automate sequences of actions, but such tools may have limited ability in responding to changes (e.g., events) that are outside the predefined context of the tools, or may have to be expanded significantly in complexity to account for all possible events. For example, some robots, such as industrial robots, may operate in a scripted, struc-tured manner, which can require establishing physical and/or virtual barriers between the robots and human actors or other sensitive subjects in the environment, as the robots may not be able to incorporate proper response behaviors to such subjects while executing scripted tasks.

Systems and methods in accordance with the present disclosure can implement a network (e.g., decider network) to facilitate reactive, state-aware/stateful decision making. In some implementations, the decider network can make reactivity a priority of the decision process, and can maintain a notion of statefulness that can allow for compatibility with state machines. For example, the decider network can oper-ate in a two-stage framework, in which (1) a logical state is identified and (2) a decision is determined responsive to the logical state. The logical state can include discrete informa-tion about the world or environment, including attributes such as "the drawer is closed", "the gripper is holding a block", "there are three blocks stacked in the order red, green, blue", etc. The logical state can be updated every cycle by a set of logical state monitors; in some implemen-tations, the logical state alone can allow for monitoring of a logical progress toward solving a task. For instance, if the goal was to stack some blocks, a human could come in and solve the problem for the robot, and with each new block stacked, the logical state would note the system's progress. Given that logical state, a user can design the decider network to automate the process of making incremental progress toward the goal, which can allow the system implementing the decider network to be task-aware. The decider network, for example, can at each cycle determine a classification of the current world and logical state into an action and a collection of parameters for that action. For example, where the goal was to place a green block on top of a yellow block (simple toy problem), if the robot currently has a green block in the gripper, then the decider network can determine to place it on the yellow block; if the robot does not currently have the green block, then the decider network can determine to grab the green block. As such, the decider network can periodically receive data indicative of the logical state of whether there's a block in the gripper and what the configuration of the blocks is; while the system is running, if the green block is removed from the gripper, the system can detect the new state of the green block (and how it differs from the previous state) to allow the decider network to pick up the green block again (rather than continuing to a predetermined next state from the state of having the green block in the gripper).

For example, a decider network can include a plurality of nodes, such as by being arranged in a structure (e.g., data structure) representative of an acyclic graph of nodes. The plurality of nodes can include at least a root node and one or more leaf nodes. The root node can be an initially accessed node, such as a node having no higher level (parent) nodes; the leaf nodes can be nodes that have no child nodes. A sequence of nodes can be accessed from the root to a leaf according to state data. For example, each node (e.g., root node, child node(s), leaf node(s)) can have decide functions that can be evaluated using at least some of the state data, such as by retrieving state data corresponding to one or more state monitors that are assigned to the node and/or the decide function of the node. The decide functions can evaluate respective state data using any of various conditions, thresh-olds, etc., such that the output of the decide functions can represent a selection of another node (e.g., state data applied to decide function of root node→selects child node; state data applied to decide function of child node→selects leaf node) or selection of an action (e.g., state data applied to decide function of leaf node→selects action, such as command, behavior, policy, etc.)

The decider network can be coupled with actions (e.g., a data structure representing actions), and can determine the actions to perform responsive to evaluation of state data regarding the environment. For example, the decider network can be coupled with one or more state monitors that detect event and/or state information regarding one or more aspects of the environment, such as the presence and/or location/pose of one or more objects, or characteristics of the one or more objects. The environment can include physical/real-world and/or simulated environments.

The decider network can be coupled with, and control operation of the robotic system using one or more rules, policies, heuristics, or combinations thereof, which can be implemented using a command API. For example, to cause the robotic system to perform an action, the decider network can access a command corresponding to the action from the command API; the command API can determine one or more motion commands corresponding to the accessed command to cause the robotic system to perform the action.

Each node of the decider network can include or perform one or more operations, such as operations relating to the node's role in the decider network. For example, the nodes can include enter, exit, and/or decide operations. The enter operations can be used to select a node for operation, such as to initialize a node. The exit operations can be used to deselect a node, such as where a current state of the environment is not applicable to operations of the node (e.g., to reduce computational resource usage for maintaining nodes in memory where not used for a cycle). The decide operation can be used to selectively perform actions and/or select lower nodes of the network. In some implementations, the decide operations can evaluate multiple possible actions to perform responsive to the current state, which can enable the decider network to have greater reactivity to changes in state (e.g., as compared with state machines, in which a node may continually pursue an action across cycles responsive to being entered, even as states change).

For example, during each cycle of operation, the system can evaluate the one or more state monitors to detect one or more states of the environment. The system can evaluate a plurality of nodes from a root node to a leaf node according to the one or more states and enter and/or exit conditions of the nodes. The system can determine, using the decide operations of the entered nodes, one or more actions to cause a robot of the system to operate according to the one or more actions.

The systems and methods described herein may be used for a variety of purposes, by way of example and without limitation, for robotics, autonomous or semi-autonomous machine applications, synthetic data and map generation, machine control, machine locomotion, machine driving, model training, perception, augmented reality, virtual reality, mixed reality, security and surveillance, simulation and digital twinning, deep learning, environment simulation, object or actor simulation and/or digital twinning, data center processing, conversational AI, (large) language models, light transport simulation (e.g., ray-tracing, path tracing, etc.), collaborative content creation for 3D assets, cloud computing and/or any other suitable applications.

Disclosed embodiments may be comprised in a variety of different systems such as systems implemented using a robot, systems for performing synthetic data generation operations, automotive systems (e.g., a control system for an autonomous or semi-autonomous machine, a perception system for an autonomous or semi-autonomous machine), aerial systems, medical systems, boating systems, smart area monitoring systems, systems for performing deep learning operations, systems for performing simulation operations, systems for performing digital twin operations, systems implemented using an edge device, systems incorporating one or more virtual machines (VMs), systems implemented at least partially in a data center, systems for performing conversational AI operations, systems for performing generative AI operations (e.g., with one or more language models), systems for performing light transport simulation, systems for performing collaborative content creation for 3D assets, systems implemented at least partially using cloud computing resources, and/or other types of systems.

FIG. 1 is an example computing environment including a system 100, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. The system 100 or components thereof can include any function, model (e.g., machine learning model, neural network, data representation of an environment or object or agent in the environment), operation, rules, heuristics, algorithms, routine, logic, or instructions to perform functions such as operating a decider network to reactively control robotic systems or devices responsive to sensor inputs, such as real-world or synthetic (e.g., virtual) sensor data indicative of an environment and objects in the environment.

Various aspects of the system can be implemented by one or more devices or systems that can be communicatively coupled with one another. For example, the system 100 can be implemented by a controller or operating system of a robot or robotic system. At least some aspects of the system 100 can be implemented by a system remote from the robot; for example, some sensors 104 may be coupled with the robot, while other sensors 104 may be remote from the robot; one or more sensors 104, perception 108, or robot controller 128 can be implemented by the robot, while at least some aspects of belief processor 110 can be implemented by a server or other system remote from the robot. As an illustrative example described further herein, the system 100 can be implemented to allow a robotic arm to follow a ball (e.g., object) responsive to sensor data from a camera (e.g., a stream of images from the camera).

As depicted in FIG. 1, the system 100 can include or communicate with at least one sensor 104. The sensors 104 can include any of a variety of sensors or sources of sensor data, such as databases, to provide sensor data of one or more environments. The environments can include real-world/physical and/or virtual/simulated environments (e.g., worlds). For example, the sensors 104 can include physical or real-world sensors, or simulated sensors that provide simulated sensor data, which may represent a simulated or virtual environment, or may be provided in a manner analogous to real-world sensor data (e.g., by providing sensor data having data structures, frame rates, sample rates, signal and/or noise qualities, or various other such features in a manner that simulates real-world sensor data. The sensors 104 can include, for example and without limitation, image sensors (e.g., cameras, image capture devices, RGB-D sensors, LIDAR sensors, radar sensors, CT, MRI, X-ray, ultrasound, microwave, etc.), audio sensors (e.g., microphones), motion sensors, proximity sensors, switches, temperature sensors, pressure sensors, or various combinations thereof. The sensors 104 can output sensor data periodically and/or responsive to a request to sample the sensor data. For example, the sensors 104 can include one or more cameras to detect images of the environment in which the ball can be represented.

The system 100 can include at least one perception system 108. The perception system 108 can receive the sensor data 104 and determine perception data based at least on the sensor data. In some implementations, the perception system 108 includes the at least one sensor 104 and/or provides the perception data as the sensor data. In some implementations, the perception system 108 processes the sensor data to determine one or more characteristics (e.g., attributes, parameters, variables) regarding one or more objects in the environment. For example, the perception system 108 can perform any of a variety of object detection algorithms or processes (e.g., neural network/machine learning computer vision; template matching, etc.) to detect the one or more objects. The perception system 108 can determine characteristics of the objects such as positions (e.g., in a local frame of reference of the object, a frame of reference of the sensor that provided the sensor data from which the object was detected, or a global frame of reference), orientations, poses, sizes, colors, motion (e.g., velocity, acceleration, rotation), temperatures, pressures, or combinations thereof or changes thereof (e.g., changes in characteristics between instances of receiving sensor data). The perception system 108 can perform perception tasks such as identifying or classifying the one or more objects (e.g., according to the characteristics of the objects). For example, the perception system 108 can detect the ball from the sensor data and output perception data that indicates at least one of an identifier of the ball or a position of the ball.

The system 100 can include at least one belief processor 110, which can include portions of the system 100 that perform operates in a robot model representation of the environment (e.g., belief world model; robot world model). For example, the robot model representation may be a model indicative of a state of information regarding the environment maintained by the system 100 and/or the belief processor 110, which may or may not be equivalent or identical to an actual state of information regarding the environment (e.g., may be different than sensor data and/or perception data provided by the perception system 108). In some implementations, the system 100 does not distinguish the belief processor 110 from other components of the system 100, such as the perception system 108 or robot controller 128. In some implementations, separating the belief processor 110 from one or more of the sensors 104, perception system 110, and robot controller 128 can allow the belief processor 110 to be operated, simulated, tested, debugged, etc. in a more modular manner.

In some implementations, the system 100 includes at least one world model 112. The world model 112 can include a representation of the robot and/or objects in the environment, such as to indicate positions of the robot or portions of the robot (e.g., arms, actuators, end effectors, movement members, etc.) in the environment. The world model 112 can have a frame of reference, which can be the same as or different from the frame of reference of sensor data from the sensors 104 and/or perception data from the perception system 108. The world model 112 can include a two-dimensional (2D) or three-dimensional (3D) representation of the environment, such as a cartesian coordinate representation (e.g., X-Y-Z coordinate system representation). The system 100 can maintain the world model 112 in various manners, such as by using a universal scene description (USD) representation.

The system 100 can modify or update the world model 112 responsive to the perception data from the perception system 108. For example, the system 100 can indicate or update a position of the ball in the world model 112 according to the position of the ball as represented by the perception system 108, such as to synchronize the world model 112 with the perception data. The system 100 can update the world model 112 synchronously (e.g., responsive to each instance of receiving perception data) or asynchronously (e.g., fewer than each instance of receiving perception data) with perception data reception.

Referring further to FIG. 1, the system 100 can include at least one state monitor 116. The state monitor 116 can evaluate the world model 112 to determine a state, such as a logical state (e.g., true/false state, categorical state) of a parameter regarding the environment, the robot, one or more objects in the environment, or variations combinations thereof. For example, the state monitor 116 can evaluate any of a variety of rules, thresholds, conditions, functions, algorithms, or various combinations thereof to determine the state of a parameter. The parameters can include any of a variety of parameters to be monitored, for example and without limitation positions, relative positions or distances (e.g., distances between objects and the robot), whether objects are held or not held by the robot, whether objects (or the robot) have positions, orientations, temperatures, pressures, colors, or other parameters that meet respective conditions, or various combinations thereof. For example, the state monitor 116 can determine, according to the position of a door in the world model 112, whether the door is in an open state or a closed state. The state monitor 116 can determine, according to a position of the ball in the world model 112, whether the ball is in a state of being held or not in a state of being held; whether the ball is within a threshold distance from the robot indicative of the robot being able to move to reach the ball in a target duration (e.g., single cycle duration); whether the ball's position relative to the robot is increasing, constant, or decreasing; among various other examples. The state monitors 116 can output state data including an indication of at least one of the parameter or the state of the parameter. The state monitors 116 can indicate a current state, such as a state for a current time step or cycle. The state monitors 116 can maintain in memory one or more previous states, and update the one or more previous states (or determine new states) responsive to the perception data to determine the current states.

In some implementations, the state monitors 116 include at least one state monitor 116 that is independent of states and/or parameters of the robot. For example, the state monitor 116 can monitor states of and/or states of parameters of objects in the environment separately from states of and/or states of parameters of the robot or components of the robot. This can allow the system 100 to operate with state machines while also being able to be reactive to states and/or outputs of state machines.

Referring further to FIG. 1, the system 100 can include at least one decider 120. The decider 120 can perform functions including determining decisions in response to state data, such as actions (e.g., reactive decisions) for the robot to perform (or not perform) based at least on the state data provided by the state monitors 116. In some implementations, the decider 120 determines at least one action according to the state data, and uses command generator 124 (e.g., an API exposing available commands) to select commands to provide to the robot according to the at least one action. For example, responsive to determining that the state data indicates that the ball has moved further away from the robot that in a previous state, the decider 120 can determine an action to cause the robot to move towards the ball (e.g., to select a command that causes the robot to move towards the ball).

The decider 120 can include at least one network 122 (e.g., decider network). The network 122 can include one or more nodes. At least some nodes can be connected with one another (the connections represented as edges), such that an evaluation of a node or an output of a node results in evaluation of another node. The decider 120 can use the state data to evaluate the nodes to determine the action according to the state data and the nodes. In some implementations, the nodes are connected to be arranged in a graph, such as an acyclic graph (e.g., directed acyclic graph). For example, the network 122 can be an acyclic graph such that the network 122 does not include any cycles, e.g., does not provide for any paths of nodes such that a path from a given node can return to the given node via other nodes. The network 122 can be a directed graph such that the connections between nodes go in one direction but not the other.

Figure 2:
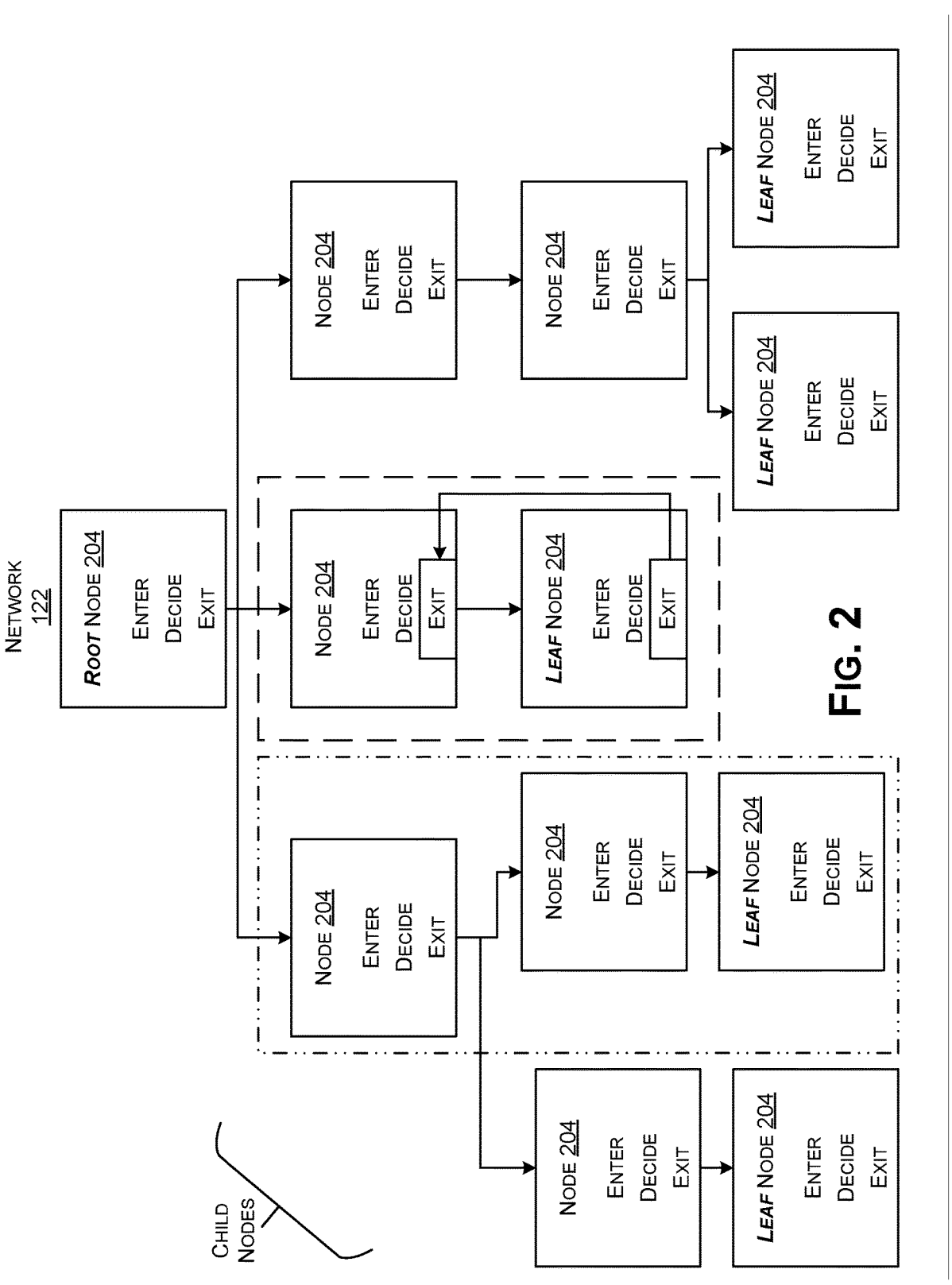
FIG. 2 is a schematic diagram of an example of an acyclic 30 graph decision node network that can be implement for the system of FIG. 1, in accordance with some embodiments of the present disclosure.

As depicted in FIG. 2, the network 122 can include a plurality of nodes 204. The nodes 204 can be configured to be connected by edges 208, which can represent the selection of a second node 204 responsive to processing by a first node 204. In some implementations, the network 122 includes a root node 204, such as a single root node 204. The root node 204 can be a node that does not have any edges 208 that lead to the root node 204 (e.g., evaluation of nodes 204 other than the root node 204 does not result in selection of the root node 204). The plurality of nodes 204 can include a plurality of child nodes 204, which can be nodes 204 that are selectable responsive to evaluation of other nodes 204. The plurality of node 204 can include at least one leaf node 204, which can be a node that does not have any child nodes (e.g., evaluation of the leaf nodes 204 does not lead to selection of any other nodes 204).

In some implementations, the nodes 204 can access at least one context object 212. The context object 212 can allow the nodes 204 to access information, such as state data, using an application programming interface (API) of the state monitors 116. The context object 212 can allow the nodes 204 to access command information, such as commands of an API of the command generator 124. For example, the context object 212 can provide access to any of a plurality of state monitors 116; state monitors 116 can be selectively coupled with various nodes 204 to allow the nodes to retrieve state data from state monitors 116. In some implementations, a first node 204 of the plurality of nodes 204 can access state data from a first state monitor 116, and a second node of the plurality of nodes 204 can access state data from a second state monitor 116 different from the first state monitor 116.

The system 100 can determine a path (e.g., path of execution) through the network 122 according to evaluation of decide functions (e.g., decide methods) of one or more nodes 204. The decide functions can include or represent, for example and without limitation, conditions, thresholds, if/then functions, or other functions or values to evaluate according to the state data. For example, the node 204 can include a decide function that evaluates whether the robot is holding the ball to determine actions (e.g., selection of other nodes 204 and/or commands) according to the state data indicative of the position of the ball and/or whether the robot is holding the ball. As depicted in FIG. 2, the root node 204 can perform a first evaluation of the state data using the decide function of the root node 204, and select a first child node 204 responsive to the first evaluation, such that the path of execution proceeds along the root node 204 and the first child node 204. In some implementations, the system 100 operates the network 122 along the path of execution until a leaf node 204 is reached; the leaf node 204 can have a decide function that selects a command (e.g., using the API of the command generator 124) according to the state data evaluated by the decide function of the leaf node 204. For example, responsive to selecting a given node 204, the system 100 can retrieved state data from one or more state monitors 116 assigned to the given node 204, and evaluate the decide function of the given node 204 according to the retrieved state data to determine the output of the decide function, such as by processing the retrieved state data relative to one or more thresholds of the decide function to perform a selection of another node 204 or a command from the command API of the command generator 124.

As noted above, the network 122 can be arranged according to an acyclic graph having nodes 204; the nodes 204 can define the edges between nodes 204 according to the outputs of the decide functions of the nodes 204, which indicate selections of nodes 204 responsive to evaluating the decide functions using state data. The root node 204 can represent the first node 204 that is selected by the system 100 in a given cycle of operating the network 122; for example, the system 100 can evaluate the decide function of the root node 204 prior to evaluating the decide functions of any other node 204.

In some implementations, the decide functions of the nodes 204 have output(s) that (i) select or otherwise identify another node 204 (e.g., where the decide function is of a node 204 that is not a leaf node 204) or (ii) select or otherwise identify a command (e.g., where the decide function is of a node 204 that is a leaf node 204). In some implementations, the decide function can have a first output that identifies a command and a second output that identifiers another node 204.

For example, in a given cycle of evaluating state data (e.g., state data regarding at least one of the environment or the robot), the system 100 can evaluate the decide function of the root node 204 according to the state data to select a (first) child node 204 of the network 122; responsive to selecting the (first) child node 204, the system 100 can evaluate the decide function of the selected first child node 204 to (i) determine a selection of a (second) child node 204; the system 100 can continue to evaluate the decide functions of nodes 204 to either select other nodes 204 or select the command(s) for the robot (where the decide function's outputs indicate behaviors, policies, commands, etc.). Responsive to selecting the command(s), the system 100, in some implementations, can proceed to a subsequent cycle of operating the network 122, such as by processing updated sensor data/perception data to determine updated state data.

In some implementations, the system 100 can operate the network 122 in a plurality of cycles (e.g., 60 Hz cycles). In each cycle, the system 100 can first evaluate the state data using the decide function of the root node 204, then continue to evaluate child nodes 204 selected according to previous evaluations along the path of execution until a leaf node 204 is reached, in order to select a command using the leaf node 204. The network 122 can use the decide functions, such as paths of execution according to evaluation of decide functions that can result in selection of nodes 204 and/or commands, to represent target behaviors for the robot.

In some implementations, each node 204 can include at least one of an enter function (e.g., enter method) or an exit function (e.g., exit method). For example, each node 204 can include a respective enter function, decide function, and exit function. In a path of execution in which a node 204 was not selected during a previous path (e.g., in an initial path of execution of the network 122; in a path of execution subsequent to changing a branch of execution), the system 100 can use the enter function to select the node 204 in order to evaluate the decide function of the node. For example, in the initial path (e.g., cycle) of execution of the network 122, the system 100 can execute the enter function of the root node 204 in order to evaluate the decide function of the root node 204; responsive to the evaluation of the decide function of the root node 204, the system 100 can select the child node 204 from the root node 204 according to the result of the evaluation of the decide function of the root node 204, and the system 100 can continue to use enter functions responsive to selecting nodes 204 until reaching the leaf node 204 used to select the appropriate command. For example, in a cycle, the system 100 can operate the network 122 to trace from the root node 204 to a corresponding leaf 204, creating an execution path (the sequence of nodes 204 selected according to evaluations of decide functions). From cycle to cycle the system 100 can maintain a record of (e.g., keep track of) the execution path, and can use the previous path to determine whether the nodes 204 are making the same decisions as before, or making different decisions (e.g., evaluating decide functions to reach the same results or different results); as such, the network 122 can have statefulness.

The system 100 can use the exit functions of nodes 204 responsive to a change in the execution path. For example, as depicted by the dashed boundary in FIG. 2, responsive to a change in the result of a decide function of the root node 204 (such that the root node 204 represents a branch node), the system 100 can execute the exit functions (e.g., in an order starting from the previously selected leaf node 204 up to the branch node 204), and subsequently use the enter function of the child node 204 of the newly selected path of execution (depicted by the dash-double dot boundary) to continue processing decide functions of nodes to the corresponding leaf node 204. For example, in the example depicted in FIG. 2, the root node 204 can have a decide function that evaluates state data indicative of whether the robot is in range of grabbing the ball; responsive to the robot being in range of grabbing the ball, the decide function can cause the network 122 to select the nodes 204 down to the leaf node 204 for causing a grab behavior (e.g., as depicted by the first path of execution of the dashed boundary); in a subsequent cycle, responsive to the decide function of the root node 204 processing state data indicating that the ball has moved out of range of the robot, the decide function of the root node 204 can cause selection of a new path of execution of nodes 204 down to a leaf node 204 representing behavior for moving the robot closer to the ball (e.g., as depicted by the second path of execution of the dash-double dot boundary), which can demonstrate the ability of the system 100 to be reactive to changes in the environment/world.

Referring back to FIG. 1, the system 100 can include a command generator 124. The command generator 124 can include or be coupled with the command API that includes functions or other operations that determine operations for the robot to perform according to commands determined by the decide functions of the leaf nodes 204 of the network 122. For example, the command API can represent programmatic/code layer/semantic functions or operations for the robot to perform. In some implementations, the command API is provided by an entity that maintains or operates the robot, such as to allow a separate entity (e.g., the system 100) to define behaviors for the robot to perform using the network 122 and map the behaviors to commands using the command API of the command generator 124.

For example, the command generator 124 can include a plurality of policies for the robot to follow to perform behaviors. The policies can include or represent, for example and without limitations, policies for behaviors such as following an object, moving away from an object, collision avoidance, retrieving an object, positioning an object in a target location, etc. The command generator 124 can determine commands representing parameters for performing the behaviors and/or policies, including and without limitation, parameters such as position, velocity, acceleration, direction, rotation, pose, orders of operations, timings of operations, or various combinations thereof. For example, responsive to a response decision received from the decider 120 to move the robot towards the ball, the command generator 124 can generate a command to move the robot towards the ball (e.g., a command indicating a direction to move the robot to cause the robot to move towards the ball).

In some implementations, the system 100 includes a robot controller 128. The robot controller 128 can determine motion control operations for various components of the robot to perform responsive to commands received from the decider 120 via the command generator 124. For example, the robot controller 128 can determine, according to the command received from the command generator 124 and/or parameters of the command, control signals to provide to any of various motors, actuators, drivers, or combinations thereof of the robot to cause the robot to move (e.g., in the physical/real-world or virtual/simulated environment) according to the command.

Referring further to FIGS. 1 and 2, the system 100 can operate in a cyclic manner. For example, in a given cycle, the perception system 108 can receive a sample of sensor data (e.g., an image, etc.) from the at least one sensor 104 and can determine perception data according to the sensor data; the world model 112 can update a representation of one or more objects or features of the environment according to at least one of the sensor data or the perception data; the state monitors 116 can update states according to the updated world model 112; the decider 120 can determine one or more actions according to the updated states; the command generator 124 can determine at least one command for controlling the robot according to the one or more actions; and the robot controller 128 can cause operation of the robot according to the at least one command. Various such operations can be iteratively performed for the plurality of cycles; any one or more cycles can be initiated subsequent to sampling of sensor data; this can allow, for example, the actions determined by the decider 120 to be responsive to a most recent sample of sensor data.

Figure 3:
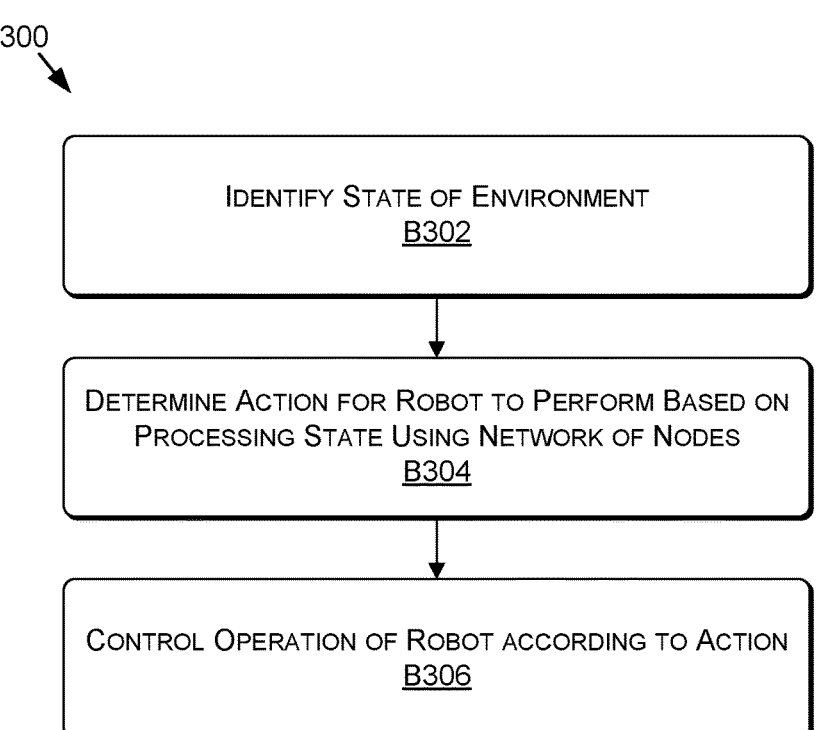
FIG. 3 is a flow diagram of an example of a method for decider networks for reactive decision-making, in accordance with some embodiments of the present disclosure.

Now referring to FIG. 3, each block of method 300, described herein, comprises a computing process that may be performed using any combination of hardware, firmware, and/or software. For instance, various functions may be carried out by a processor executing instructions stored in memory. The method 300 may also be embodied as computer-usable instructions stored on computer storage media. The method 300 may be provided by a standalone application, a service or hosted service (standalone or in combination with another hosted service), or a plug-in to another product, to name a few. In addition, method 300 is described, by way of example, with respect to the systems of FIG. 1 and FIG. 2. However, this method 300 may additionally or alternatively be executed by any one system, or any combination of systems, including, but not limited to, those described herein.

FIG. 3 is a flow diagram showing a method 300 for reactive decision-making using a node network, such as for controlling robotic systems in dynamic environments, in accordance with some embodiments of the present disclosure. Various operations of the method 300 can be implemented by the same or different devices or entities at various points in time. For example, one or more first devices may implement operations relating to detecting and processing sensor data, and one or more second devices may implement operations relating to applying the sensor data to the node network to determine actions and controlling a robot according to the determined actions.

The method 300, at block B302, includes detecting at least one state of an environment. Detecting the at least one state can include detecting or identifying states of objects in the environment, of a robot in the environment, or of the environment (e.g., temperature, pressure, lighting of the environment). The environment can include one or more of a real-world environment, a physical environment, a virtual environment, or a simulated environment.

In some implementations, detecting the at least one state includes receiving sensor data from one or more sensors. The sensors can include sensors located in the environment and/or coupled with the robot. The sensors can include virtual sensor representations, such as processes that generate sensor data (e.g., by retrieving sensor data from databases; by operating a simulation) in a format analogous to sensor data. One or more logical state monitors can compare the state data with corresponding thresholds or conditions (e.g., combinations of thresholds; classifiers) indicative of states to determine the states. For example, the logical state monitor can compare the sensor data (or perception information determined by processing the state data) with a threshold and determine the state to have a first state value responsive to the sensor data being less than the threshold, or determine the state to have a second state value different from the first state value responsive to the sensor data being greater than the threshold.

The method 300, at block B304, includes determining at least one action for the robot to perform, based at least on processing the state data using a network of nodes. The nodes can be arranged as an acyclic graph, and can include a root node and at least one leaf node. In some implementations, determining the at least one action includes iteratively determining a plurality of actions over a plurality of cycles (e.g., iterations) of evaluating functions of the network of nodes according to the state data. Determining the at least one action can include evaluating, by the root node, the state data; selecting, according to the evaluation, at least one child node mapped to the root node (the child node(s) may or may not include leaf nodes; the mapping can be represented by the outputs of the functions, such as decide functions, of the nodes, such that a first edge from a first node to a second node can be defined by a first output of the decide function of the first node, and a second edge from the first node to a third node can be defined by a second output of the decide function of the first node); and continually evaluating the state data using nodes until a leaf node is selected. The leaf node (e.g., a function of the leaf node) can evaluate the state data to select the at least one action. For example, the leaf node can select a policy or behavior for the robot to perform according to the state data, and retrieve a command (e.g., from a command API) corresponding to the selected policy or behavior to determine the command as the at least one action. Determining the at least one action can include determining parameters of motion for the robot to perform, such as position, velocity, acceleration, rotation, pose, etc. Determining the at least one action can include determining parameters of forces or torques for the robot to apply to the environment, such as to an object in the environment.

The method 300, at block B306, includes controlling operation of the robot according to the at least one action. Controlling operation of the robot can include processing the command to determine a control signal to provide to at least one actuator of the robot to cause the robot to perform the at least one action. For example, a controller of the robot can apply the command as input to any of a variety of motion control algorithms to determine parameters of control signals (e.g., voltages, periodicity, pulse-width modulations, etc.) to drive any one or more actuators (for example and without limitation, motors, linear actuators, rotary actuators) of the robot, such as to drive the robot according to position, velocity, acceleration, rotation, and/or pose targets represented by the commands. In some implementations, controlling operation of the robot includes periodically processing the sensor data to update the state data and commands for controlling operation of the robot. In some implementations, controlling operation of the robot includes deactivating operation of the robot responsive to evaluation of the state data indicating that no actions are to be performed.

Example Content Streaming System

Figure 4:
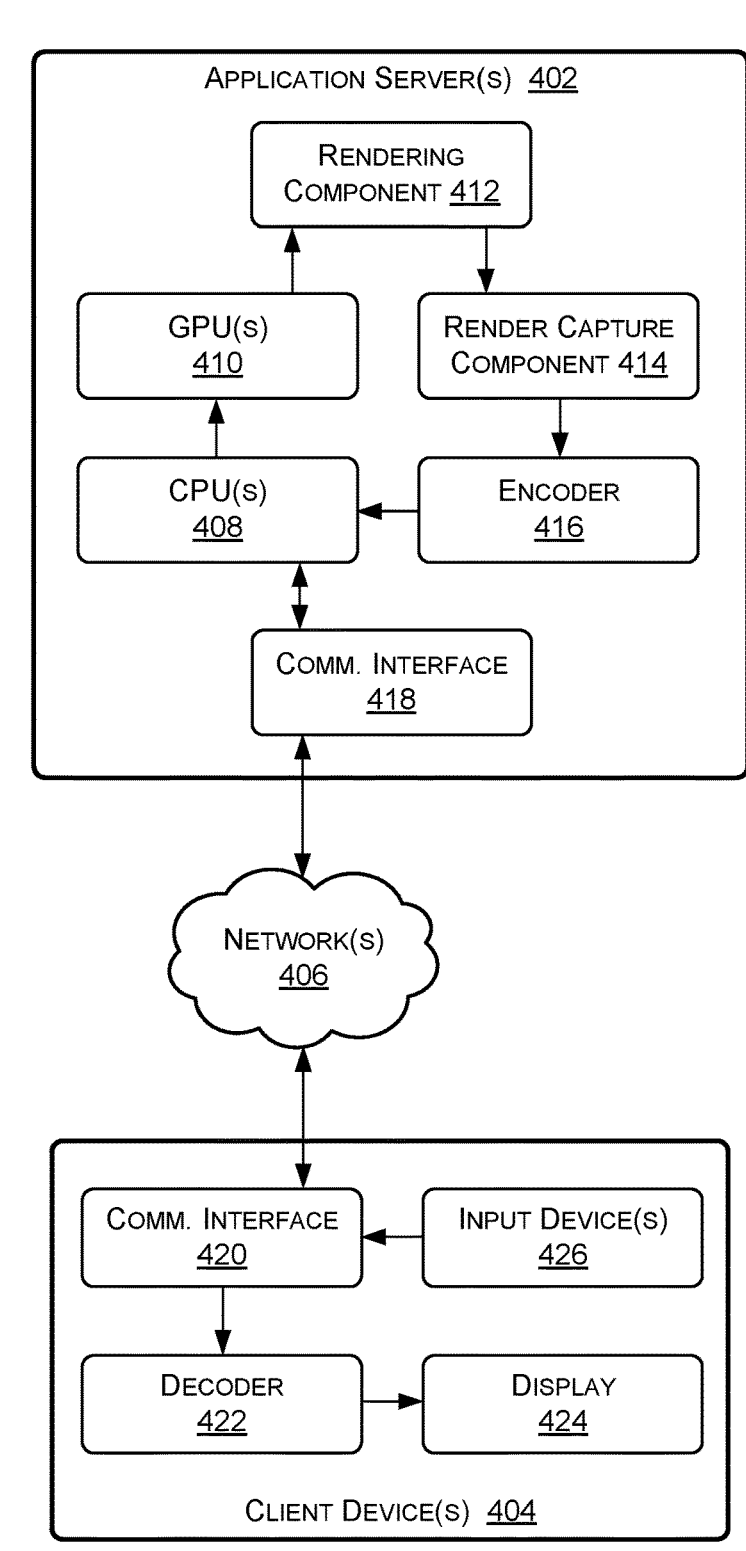
FIG. 4 is a block diagram of an example content stream-ing system suitable for use in implementing some embodi-ments of the present disclosure.

Now referring to FIG. 4, FIG. 4 is an example system diagram for a content streaming system 400, in accordance with some embodiments of the present disclosure. FIG. 4 includes application server(s) 402 (which may include similar components, features, and/or functionality to the example computing device 500 of FIG. 5), client device(s) 404 (which may include similar components, features, and/or functionality to the example computing device 500 of FIG. 5), and network(s) 406 (which may be similar to the network(s) described herein). In some embodiments of the present disclosure, the system 400 may be implemented to perform diffusion model training and runtime operations. The application session may correspond to a game streaming application (e.g., NVIDIA GeFORCE NOW), a remote desktop application, a simulation application (e.g., autonomous or semi-autonomous vehicle simulation), computer aided design (CAD) applications, virtual reality (VR) and/or augmented reality (AR) streaming applications, deep learning applications, and/or other application types. For example, the system 400 can be implemented to receive sensor data, provide the sensor data to a perception system to detect characteristics of objects and/or an environment using the sensor data, evaluate states using logical monitors according to the characteristics and/or the sensor data, process the states using decision networks to determine commands for a robot to perform according to the states, and control operation of the robot according to the commands.

In the system 400, for an application session, the client device(s) 404 may only receive input data in response to inputs to the input device(s), transmit the input data to the application server(s) 402, receive encoded display data from the application server(s) 402, and display the display data on the display 424. As such, the more computationally intense computing and processing is offloaded to the application server(s) 402 (e.g., rendering—in particular ray or path tracing—for graphical output of the application session is executed by the GPU(s) of the game server(s) 402). In other words, the application session is streamed to the client device(s) 404 from the application server(s) 402, thereby reducing the requirements of the client device(s) 404 for graphics processing and rendering.

For example, with respect to an instantiation of an application session, a client device 404 may be displaying a frame of the application session on the display 424 based on receiving the display data from the application server(s) 402. The client device 404 may receive an input to one of the input device(s) and generate input data in response, such as to provide modification inputs of a driving signal for use by modifier 112. The client device 404 may transmit the input data to the application server(s) 402 via the communication interface 420 and over the network(s) 406 (e.g., the Internet), and the application server(s) 402 may receive the input data via the communication interface 418. The CPU(s) 408 may receive the input data, process the input data, and transmit data to the GPU(s) 410 that causes the GPU(s) 410 to generate a rendering of the application session. For example, the input data may be representative of a movement of a character of the user in a game session of a game application, firing a weapon, reloading, passing a ball, turning a vehicle, etc. The rendering component 412 may render the application session (e.g., representative of the result of the input data) and the render capture component 414 may capture the rendering of the application session as display data (e.g., as image data capturing the rendered frame of the application session). The rendering of the application session may include ray or path-traced lighting and/or shadow effects, computed using one or more parallel processing units—such as GPUs, which may further employ the use of one or more dedicated hardware accelerators or processing cores to perform ray or path-tracing techniques—of the application server(s) 402. In some embodiments, one or more virtual machines (VMs)—e.g., including one or more virtual components, such as vGPUs, vCPUs, etc.—may be used by the application server(s) 402 to support the application sessions. The encoder 416 may then encode the display data to generate encoded display data and the encoded display data may be transmitted to the client device 404 over the network(s) 406 via the communication interface 418. The client device 404 may receive the encoded display data via the communication interface 420 and the decoder 422 may decode the encoded display data to generate the display data. The client device 404 may then display the display data via the display 424, such as to display a top-down/BEV map of a scene or an environment.

Example Computing Device

Figure 5:
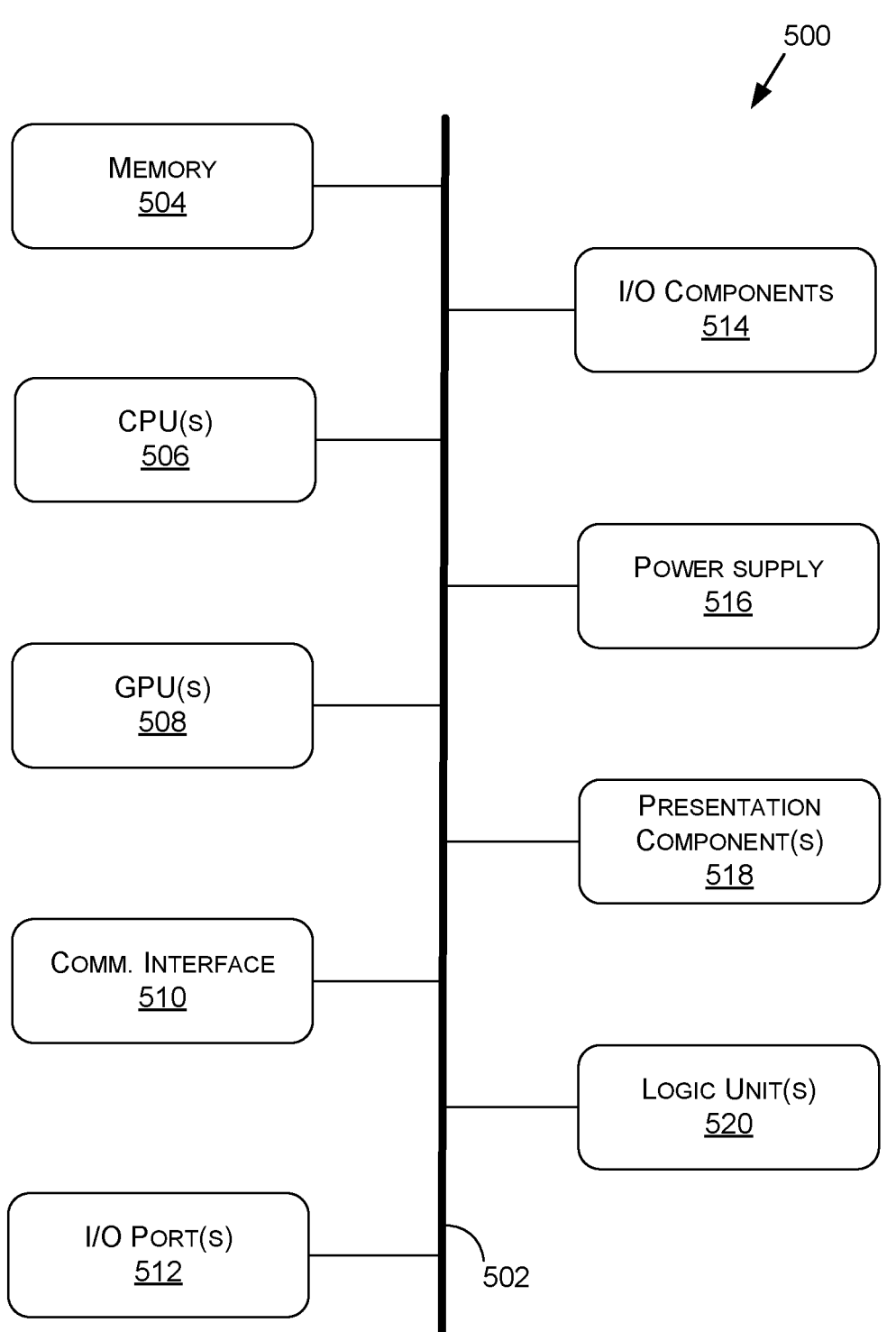
FIG. 5 is a block diagram of an example computing 40 device suitable for use in implementing some embodiments of the present disclosure.

FIG. 5 is a block diagram of an example computing device(s) 500 suitable for use in implementing some embodiments of the present disclosure. Computing device 500 may include an interconnect system 502 that directly or indirectly couples the following devices: memory 504, one or more central processing units (CPUs) 506, one or more graphics processing units (GPUs) 508, a communication interface 510, input/output (I/O) ports 512, input/output components 514, a power supply 516, one or more presentation components 518 (e.g., display(s)), and one or more logic units 520. In at least one embodiment, the computing device(s) 500 may comprise one or more virtual machines (VMs), and/or any of the components thereof may comprise virtual components (e.g., virtual hardware components). For non-limiting examples, one or more of the GPUs 508 may comprise one or more vGPUs, one or more of the CPUs 506 may comprise one or more vCPUs, and/or one or more of the logic units 520 may comprise one or more virtual logic units. As such, a computing device(s) 500 may include discrete components (e.g., a full GPU dedicated to the computing device 500), virtual components (e.g., a portion of a GPU dedicated to the computing device 500), or a combination thereof.

Although the various blocks of FIG. 5 are shown as connected via the interconnect system 502 with lines, this is not intended to be limiting and is for clarity only. For example, in some embodiments, a presentation component 518, such as a display device, may be considered an I/O component 514 (e.g., if the display is a touch screen). As another example, the CPUs 506 and/or GPUs 508 may include memory (e.g., the memory 504 may be representative of a storage device in addition to the memory of the GPUs 508, the CPUs 506, and/or other components). In other words, the computing device of FIG. 5 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 5.

The interconnect system 502 may represent one or more links or busses, such as an address bus, a data bus, a control bus, or a combination thereof. The interconnect system 502 may be arranged in various topologies, including but not limited to bus, star, ring, mesh, tree, or hybrid topologies. The interconnect system 502 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 506 may be directly connected to the memory 504. Further, the CPU 506 may be directly connected to the GPU 508. Where there is direct, or point-to-point connection between components, the interconnect system 502 may include a PCIe link to carry out the connection. In these examples, a PCI bus need not be included in the computing device 500.

The memory 504 may include any of a variety of computer-readable media. The computer-readable media may be any available media that may be accessed by the computing device 500. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 504 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 500. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 506 may be configured to execute at least some of the computer-readable instructions to control one or more components of the computing device 500 to perform one or more of the methods and/or processes described herein. The CPU(s) 506 may each include one or more cores (e.g., one, two, four, eight, twenty-eight, seventy-two, etc.) that are capable of handling a multitude of software threads simultaneously. The CPU(s) 506 may include any type of processor, and may include different types of processors depending on the type of computing device 500 implemented (e.g., processors with fewer cores for mobile devices and processors with more cores for servers). For example, depending on the type of computing device 500, the processor may be an Advanced RISC Machines (ARM) processor implemented using Reduced Instruction Set Computing (RISC) or an x86 processor implemented using Complex Instruction Set Computing (CISC). The computing device 500 may include one or more CPUs 506 in addition to one or more microprocessors or supplementary co-processors, such as math co-processors.

In addition to or alternatively from the CPU(s) 506, the GPU(s) 508 may be configured to execute at least some of the computer-readable instructions to control one or more components of the computing device 500 to perform one or more of the methods and/or processes described herein. One or more of the GPU(s) 508 may be an integrated GPU (e.g., with one or more of the CPU(s) 506 and/or one or more of the GPU(s) 508 may be a discrete GPU. In embodiments, one or more of the GPU(s) 508 may be a coprocessor of one or more of the CPU(s) 506. The GPU(s) 508 may be used by the computing device 500 to render graphics (e.g., 3D graphics) or perform general purpose computations. For example, the GPU(s) 508 may be used for General-Purpose computing on GPUs (GPGPU). The GPU(s) 508 may include hundreds or thousands of cores that are capable of handling hundreds or thousands of software threads simultaneously. The GPU(s) 508 may generate pixel data for output images in response to rendering commands (e.g., rendering commands from the CPU(s) 506 received via a host interface). The GPU(s) 508 may include graphics memory, such as display memory, for storing pixel data or any other suitable data, such as GPGPU data. The display memory may be included as part of the memory 504. The GPU(s) 508 may include two or more GPUs operating in parallel (e.g., via a link). The link may directly connect the GPUs (e.g., using NVLINK) or may connect the GPUs through a switch (e.g., using NVSwitch). When combined together, each GPU 508 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 506 and/or the GPU(s) 508, the logic unit(s) 520 may be configured to execute at least some of the computer-readable instructions to control one or more components of the computing device 500 to perform one or more of the methods and/or processes described herein. In embodiments, the CPU(s) 506, the GPU(s) 508, and/or the logic unit(s) 520 may discretely or jointly perform any combination of the methods, processes and/or portions thereof. One or more of the logic units 520 may be part of and/or integrated in one or more of the CPU(s) 506 and/or the GPU(s) 508 and/or one or more of the logic units 520 may be discrete components or otherwise external to the CPU(s) 506 and/or the GPU(s) 508. In embodiments, one or more of the logic units 520 may be a coprocessor of one or more of the CPU(s) 506 and/or one or more of the GPU(s) 508.

Examples of the logic unit(s) 520 include one or more processing cores and/or components thereof, such as Data Processing Units (DPUs), Tensor Cores (TCs), Tensor Processing Units(TPUs), Pixel Visual Cores (PVCs), Vision Processing Units (VPUs), Image Processing Units (IPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 510 may include one or more receivers, transmitters, and/or transceivers that allow the computing device 500 to communicate with other computing devices via an electronic communication network, included wired and/or wireless communications. The communication interface 510 may include components and functionality to allow communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 520 and/or communication interface 510 may include one or more data processing units (DPUs) to transmit data received over a network and/or through interconnect system 502 directly to (e.g., a memory of) one or more GPU(s) 508. In some embodiments, a plurality of computing devices 500 or components thereof, which may be similar or different to one another in various respects, can be communicatively coupled to transmit and receive data for performing various operations described herein, such as to facilitate latency reduction.

The I/O ports 512 may allow the computing device 500 to be logically coupled to other devices including the I/O components 514, the presentation component(s) 518, and/or other components, some of which may be built in to (e.g., integrated in) the computing device 500. Illustrative I/O components 514 include a microphone, mouse, keyboard, joystick, game pad, game controller, satellite dish, scanner, printer, wireless device, etc. The I/O components 514 may provide a natural user interface (NUI) that processes air gestures, voice, or other physiological inputs generated by a user, such as to generate a driving signal for use by modifier 112, or a reference image (e.g., images 104). In some instances, inputs may be transmitted to an appropriate network element for further processing, such as to modify and register images. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 500. The computing device 500 may be include depth cameras, such as stereoscopic camera systems, infrared camera systems, RGB camera systems, touchscreen technology, and combinations of these, for gesture detection and recognition. Additionally, the computing device 500 may include accelerometers or gyroscopes (e.g., as part of an inertia measurement unit (IMU)) that allow detection of motion. In some examples, the output of the accelerometers or gyroscopes may be used by the computing device 500 to render immersive augmented reality or virtual reality.

The power supply 516 may include a hard-wired power supply, a battery power supply, or a combination thereof. The power supply 516 may provide power to the computing device 500 to allow the components of the computing device 500 to operate.

The presentation component(s) 518 may include a display (e.g., a monitor, a touch screen, a television screen, a heads-up-display (HUD), other display types, or a combination thereof), speakers, and/or other presentation components. The presentation component(s) 518 may receive data from other components (e.g., the GPU(s) 508, the CPU(s) 506, DPUs, etc.), and output the data (e.g., as an image, video, sound, etc.).

Example Data Center

FIG. 6 illustrates an example data center 600 that may be used in at least one embodiments of the present disclosure, such as to implement the systems 100, 200 in one or more examples of the data center 600. The data center 600 may include a data center infrastructure layer 610, a framework layer 620, a software layer 630, and/or an application layer 640.

As shown in FIG. 6, the data center infrastructure layer 610 may include a resource orchestrator 612, grouped computing resources 614, and node computing resources ("node C.R.s") 616(1)-616(N), where "N" represents any whole, positive integer. In at least one embodiment, node C.R.s 616(1)-616(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 616(1)-616(N) may correspond to a server having one or more of the above-mentioned computing resources. In addition, in some embodiments, the node C.R.s 616(1)-6161(N) may include one or more virtual components, such as vGPUs, vCPUs, and/or the like, and/or one or more of the node C.R.s 616(1)-616(N) may correspond to a virtual machine (VM).

In at least one embodiment, grouped computing resources 614 may include separate groupings of node C.R.s 616 housed within one or more racks (not shown), or many racks housed in data centers at various geographical locations (also not shown). Separate groupings of node C.R.s 616 within grouped computing resources 614 may include grouped compute, network, memory or storage resources that may be configured or allocated to support one or more workloads. In at least one embodiment, several node C.R.s 616 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 612 may configure or otherwise control one or more node C.R.s 616(1)-616(N) and/or grouped computing resources 614. In at least one embodiment, resource orchestrator 612 may include a software design infrastructure (SDI) management entity for the data center 600. The resource orchestrator 612 may include hardware, software, or some combination thereof.

In at least one embodiment, as shown in FIG. 6, framework layer 620 may include a job scheduler 628, a configuration manager 634, a resource manager 636, and/or a distributed file system 638. The framework layer 620 may include a framework to support software 632 of software layer 630 and/or one or more application(s) 642 of application layer 640. The software 632 or application(s) 642 may respectively include web-based service software or applications, such as those provided by Amazon Web Services, Google Cloud and Microsoft Azure. The framework layer 620 may be, but is not limited to, a type of free and open-source software web application framework such as Apache Spark™ (hereinafter "Spark") that may utilize distributed file system 638 for large-scale data processing (e.g., "big data"). In at least one embodiment, job scheduler 628 may include a Spark driver to facilitate scheduling of workloads supported by various layers of data center 600. The configuration manager 634 may be capable of configuring different layers such as software layer 630 and framework layer 620 including Spark and distributed file system 638 for supporting large-scale data processing. The resource manager 636 may be capable of managing clustered or grouped computing resources mapped to or allocated for support of distributed file system 638 and job scheduler 628. In at least one embodiment, clustered or grouped computing resources may include grouped computing resource 614 at data center infrastructure layer 610. The resource manager 636 may coordinate with resource orchestrator 612 to manage these mapped or allocated computing resources.

In at least one embodiment, software 632 included in software layer 630 may include software used by at least portions of node C.R.s 616(1)-616(N), grouped computing resources 614, and/or distributed file system 638 of framework layer 620. One or more types of software may include, but are not limited to, Internet web page search software, e-mail virus scan software, database software, and streaming video content software.

In at least one embodiment, application(s) 642 included in application layer 640 may include one or more types of applications used by at least portions of node C.R.s 616(1)-616(N), grouped computing resources 614, and/or distributed file system 638 of framework layer 620. One or more types of applications may include, but are not limited to, any number of a genomics application, a cognitive compute, and a machine learning application, including training or inferencing software, machine learning framework software (e.g., PyTorch, TensorFlow, Caffe, etc.), simulation software for rendering and updating simulated or virtual environment,s and/or other machine learning applications used in conjunction with one or more embodiments, such as to train, configure, update, and/or execute machine learning models.

In at least one embodiment, any of configuration manager 634, resource manager 636, and resource orchestrator 612 may implement any number and type of self-modifying actions based on any amount and type of data acquired in any technically feasible fashion. Self-modifying actions may relieve a data center operator of data center 600 from making possibly bad configuration decisions and possibly avoiding underutilized and/or poor performing portions of a data center.

The data center 600 may include tools, services, software or other resources to train one or more machine learning models (e.g., train models 104, 204 and/or neural networks 106, 206, etc.) or predict or infer information using one or more machine learning models according to one or more embodiments described herein. For example, a machine learning model(s) may be trained by calculating weight parameters according to a neural network architecture using software and/or computing resources described above with respect to the data center 600. In at least one embodiment, trained or deployed machine learning models corresponding to one or more neural networks may be used to infer or predict information using resources described above with respect to the data center 600 by using weight parameters calculated through one or more training techniques, such as but not limited to those described herein.

In at least one embodiment, the data center 600 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or perform inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 500 of FIG. 5—e.g., each device may include similar components, features, and/or functionality of the computing device(s) 500. In addition, where backend devices (e.g., servers, NAS, etc.) are implemented, the backend devices may be included as part of a data center 600, an example of which is described in more detail herein with respect to FIG. 6.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 500 described herein with respect to FIG. 5. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A processor comprising:
one or more circuits configured to:
identify at least one state of an environment, wherein the at least one state of the environment is identified based on a world model comprising a representation of one or more objects in the environment, the at least one state comprising at least one condition corresponding to (i) progress in performing a task by a robot and (ii) at least one characteristic of the one or more objects represented in the world model, the at least one characteristic comprising at least one of a position, an orientation, or a presence of the one or more objects represented in the world model;
determine, based at least on the at least one state and using a predefined network of nodes representative of one or more actions, one or more functions, or one or more robot states corresponding to the robot in the environment, at least one action of the one or more actions for the robot to perform in furtherance of performing the task, wherein, during each cycle of operation of the robot, the determination of the at least one action is based at least on selecting a path through the predefined network of nodes by processing the at least one state identified using a representation of the predefined network of nodes along the path, from a root node, that includes at least one fixed successive node in the predefined network for one or more nodes along the path, the at least one fixed successive node representing at least one of, a predefined action or a predefined condition;
control, during at least one cycle of operation, operation of the robot according to the at least one action; and
update the world model to indicate at least one update corresponding with the one or more objects represented in the world model, the at least one update determined according to sensor data or perception data.

2. The processor of claim 1, wherein:
the predefined network of nodes is arranged according to an acyclic graph having the root node and a plurality of leaf nodes, the root node assigned a first function of the one or more functions, the plurality of leaf nodes each assigned a respective second function of the one or more functions, each function configured to determine an output responsive to evaluating a respective condition according to at least one of (i) the at least one state of the environment or (ii) the one or more robot states of the robot, the first function indicating the path through the predefined network of nodes to a selected leaf node of the predefined network of nodes, the second function indicating a selection of the at least one action from the one or more actions; and
the one or more circuits are configured to:
evaluate the condition of the first function of the root node to determine the path of the predefined network from the root node to the selected leaf node; and
evaluate the condition of the second function of the selected leaf node, responsive to determining the path of the predefined network from the root node to the selected leaf node, to select the at least one action.

3. The processor of claim 1, wherein, for each cycle of a plurality of cycles, the one or more circuits are configured to:
perform object detection to detect the one or more objects based at least on sampling one or more sensors of the environment for the sensor data;
determine the perception data comprising the at least one characteristic of the one or more objects based at least on the sensor data;
determine the at least one state for the at least one cycle of operation; and
determine the at least one action according to the at least one state for the at least one cycle of operation.

4. The processor of claim 1, wherein the one or more circuits are configured to:
select, based at least on a first function of a first node of the predefined network and the at least one state, one of a second node of the predefined network or a third node of the predefined network; and
determine the at least one action using the selected one of the second node or third node.

5. The processor of claim 1, wherein the one or more circuits are configured to:
identify in a first cycle, based at least on a first function of the root node of the predefined network, and responsive to the at least one state having a first value, a second node of the predefined network, and determine the at least one action according to a second function of the second node; and
identify in a second cycle, based at least on the first function of the root node, and responsive to the at least one state having a second value different from the first value, a third node of the predefined network, and determine the at least one action according to a third function of the third node.

6. The processor of claim 1, wherein the environment comprises at least one of a real-world environment or a simulated environment, and wherein selecting the path through the predefined network of nodes comprises processing the at least one state identified using a decide function on successive nodes of the predefined network of nodes along the path.

7. The processor of claim 1, wherein the robot comprises at least one of a robotic arm, an end effector, a vehicle controller, a collaborative robot, or a controller of a simulation agent.

8. The processor of claim 1, wherein the one or more circuits are configured to determine, according to the at least one action and a policy associated with the at least one action, a plurality of operations for the robot to perform.

9. The processor of claim 1, wherein the one or more circuits are configured to:

maintain a record of a first path through the predefined network of nodes, in a first cycle of processing the at least one state to determine the at least one action, from the root node to at least one leaf node;

determine, in a second cycle of processing the at least one state, a branch from the first path to a second path; and perform an exit operation on each node of the predefined network of nodes from the at least one leaf node to a node associated with the branch.

10. The processor of claim 1, wherein the one or more circuits are configured to, for each respective cycle of a plurality of sequential cycles of processing the at least one state using the predefined network of nodes, re-evaluate the at least one state prior to determining the at least one action for the respective cycle.

11. The processor of claim 1, wherein the at least one state comprises a state of an object remotely positioned from the robot, and wherein the determination of the at least one action corresponding to at least one leaf node of the predefined network of nodes comprises at least one of (i) determining an enter condition, (ii) determining an exit condition, or (iii) performing a decide operation, and wherein during each cycle of operation of the robot at least one decide function or at least one exit function is performed.

12. The processor of claim 1, wherein the one or more circuits are configured to configure a data structure representing the predefined network of nodes, in a memory device of the one or more circuits, according to input received via a user interface.

13. The processor of claim 1, wherein the processor is comprised in at least one of:

a control system for an autonomous or semi-autonomous machine;

a perception system for an autonomous or semi-autonomous machine;

a system for performing simulation operations;

a system for performing digital twin operations;

a system for performing light transport simulation;

a system for performing generative AI operations;

a system for performing collaborative content creation for 3D assets;

a system for performing deep learning operations;

a system implemented using an edge device;

a system implemented using a robot;

a system implemented using a language model;

a system for performing conversational AI operations;

a system for generating synthetic data;

a system incorporating one or more virtual machines (VMs);

a system implemented at least partially in a data center; or a system implemented at least partially using cloud computing resources.

14. A system, comprising:

one or more processors configured to identify at least one state of an environment, to determine at least one action of one or more actions for a robot to execute in order to perform a task in the environment based at least on the at least one state and using a predefined network of nodes representative of one or more robot states, one or more actions, or one or more functions corresponding to the robot, to control, during at least one cycle of operation, operation of the robot according to the at least one action, and to update a world model to indicate at least one update corresponding with one or more objects represented in the world model, the at least one update determined according to sensor data or perception data; and wherein the at least one state of the environment is identified based on the world model comprising a representation of the one or more objects in the environment, the at least one state comprising at least one condition corresponding to (i) progress in performing the task by the robot and (ii) at least one characteristic of the one or more objects represented in the world model, the at least one characteristic comprising at least one of a position, an orientation, or a presence of the one or more objects represented in the world model;

wherein, during the each cycle of operation of the robot, the determination of the at least one action is based at least on selecting a path through the predefined network of nodes by processing the at least one state identified using a representation of the predefined network of nodes along the path, from a root node, that includes at least one fixed successive node in the predefined network for one or more nodes along the path, the at least one fixed successive node representing at least one of, a predefined action or a predefined condition.

15. The system of claim 14, wherein:

the predefined network of nodes is arranged according to an acyclic graph having the root node and a plurality of leaf nodes, the root node assigned a first function of the one or more functions, the plurality of leaf nodes each assigned a respective second function of the one or more functions, each function configured to determine an output responsive to evaluating a respective condition according to at least one of (i) the at least one state of the environment or (ii) the one or more robot states of the robot, the first function indicating the path through the predefined network of nodes to a selected leaf node of the predefined network of nodes, the second function indicating a selection of the at least one action from the one or more actions; and the one or more processors are configured to, for each cycle of a plurality of cycles:

receive the at least one state for the at least one cycle of operation;

determine, based at least on evaluating the at least one state for the at least one cycle of operation using the first function of the root node, a path from the root node to a selected leaf node of the plurality of leaf nodes; and determine the at least one action using the second function of the selected leaf node.

16. The system of claim 14, wherein the one or more processors are configured to:

identify in a first cycle, based at least on a first function of the root node of the predefined network, and responsive to the at least one state having a first value, a second node of the predefined network, and determine the at least one action according to a second function of the second node; and identify in a second cycle, based at least on the first function of the root node, and responsive to the at least one state having a second value different from the first value, a third node of the predefined network, and determine the at least one action according to a third function of the third node.

17. The system of claim 14, wherein the environment comprises at least one of a real-world environment or a simulated environment.

18. The system of claim 14, wherein the system is comprised in at least one of:

a control system for an autonomous or semi-autonomous machine;

a perception system for an autonomous or semi-autonomous machine;

a system for performing simulation operations;

a system for performing digital twin operations;

a system for performing generative AI operations;

a system for performing light transport simulation;

a system for performing collaborative content creation for 3D assets;

a system for performing deep learning operations;

a system implemented using an edge device a system implemented using a robot;

a system implemented using a language model;

a system for performing conversational AI operations;

a system for generating synthetic data;

a system incorporating one or more virtual machines (VMs);

a system implemented at least partially in a data center; or a system implemented at least partially using cloud computing resources.

19. A method, comprising:

performing, using one or more processors, object detection to detect one or more objects based at least on sampling one or more sensors of an environment for sensor data;

determining, using the one or more processors, perception data comprising at least one characteristic of the one or more objects based at least on the sensor data, the at least one characteristic comprising at least one of a position, an orientation, a size, a color, a motion, a temperature, a pressure of the one or more objects;

updating, during each cycle of operation using the one or more processors, a world model to indicate at least one update corresponding with the sensor data or the perception data:

identifying, using the one or more processors, at least one state of the environment, wherein the at least one state of the environment is identified based on the world model comprising a representation of the one or more objects in the environment, the at least one state comprising at least one condition corresponding to (i) progress in performing a task by a robot and (ii) the at least one characteristic of the one or more objects represented in the world model;

determining at least one action of one or more actions for the robot to complete based at least on the at least one state and using the one or more processors and a predefined network of nodes representative of the one or more actions, wherein, during each cycle of operation of the robot, the determination of the at least one action is based at least on selecting a path through the predefined network of nodes by processing the at least one state identified using a representation of the predefined network of nodes along the path, from a root node, that includes at least one fixed successive node in the predefined network for one or more nodes along the path, the at least one fixed successive node representing at least one of, a predefined action or a predefined condition; and controlling, during at least one cycle of operation, operation of the robot, using the one or more processors, according to the at least one action.

20. The method of claim 19, wherein the predefined network of nodes is arranged according to an acyclic graph having the root node and a plurality of leaf nodes, and the method further comprises:

determining, using the one or more processors and based at least on a function the root node that selects one or more other nodes of the predefined network according to the at least one state, the path of the predefined network from the root node to a selected leaf node of the plurality of leaf nodes; and determining, using the one or more processors and using a function of the selected leaf node that selects the at least one action, the at least one action.

* * * * *